United States Patent
Schwartz et al.

(10) Patent No.: US 11,636,162 B2
(45) Date of Patent: *Apr. 25, 2023

(54) MULTI-DATABASE DOCUMENT SEARCH SYSTEM ARCHITECTURE

(71) Applicant: Palantir Technologies Inc., Denver, CO (US)

(72) Inventors: Eric Schwartz, New York, NY (US); Alexander Bores, New York, NY (US); Alexander Martino, Brooklyn, NY (US); Brendan Berg, Seattle, WA (US); Charles Sharzer, New York, NY (US); Doron Shapiro, New York, NY (US); Enoch Hsiao, Washington, DC (US); Eric Knudson, Washington, DC (US); Landon Bell, Washington, DC (US); Martin Manville, Washington, DC (US); Michael Platek, Alexandria, VA (US); Nathan Bruner, Palo Alto, CA (US); Robert Giardina, Falls Church, VA (US); Sarah Beckoff, Jerusalem (IL); Tri Tang, Washington, DC (US); William Brady, Washington, DC (US); Wenshuai Hou, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,112

(22) Filed: Nov. 16, 2021

(65) Prior Publication Data
US 2022/0147576 A1 May 12, 2022

Related U.S. Application Data

(63) Continuation of application No. 16/053,370, filed on Aug. 2, 2018, now Pat. No. 11,210,349.

(51) Int. Cl.
*G06F 16/00* (2019.01)
*G06F 16/93* (2019.01)
(Continued)

(52) U.S. Cl.
CPC .......... *G06F 16/93* (2019.01); *G06F 16/2228* (2019.01); *G06F 16/2358* (2019.01); *G06F 16/248* (2019.01)

(58) Field of Classification Search
CPC .. G06F 16/93; G06F 16/2228; G06F 16/2358; G06F 16/248; G06F 16/94
See application file for complete search history.

(56) References Cited

U.S. PATENT DOCUMENTS

| 11,210,349 B1 | 12/2021 | Schwartz et al. | |
|---|---|---|---|
| 2007/0050393 A1* | 3/2007 | Vogel | G06F 16/367 707/999.102 |

(Continued)

OTHER PUBLICATIONS

U.S. Pat. No. 11,210,349, Multi-Database Document Search System Architecture, Dec. 28, 2021.

*Primary Examiner* — Tyler J Torgrimson
(74) *Attorney, Agent, or Firm* — Knobbe, Martens, Olson & Bear, LLP

(57) ABSTRACT

A document review system is configured to quickly provide search results for large amounts of documents. Ontology templates are used to generate objects and links based on the documents. Users can view documents, and linked objects and object properties can be displayed. An index assisted search can be performed to determine the linked objects and object properties. A supplemental search can be performed on a second database that tracks modifications to the documents or objects. The modifications in the second database can be periodically written to the first database, and the index can be rebuilt. The user experience can be free of slow searches and slow index rebuilds.

19 Claims, 15 Drawing Sheets

(51) Int. Cl.
*G06F 16/248* (2019.01)
*G06F 16/22* (2019.01)
*G06F 16/23* (2019.01)

(56) References Cited

U.S. PATENT DOCUMENTS

2016/0259821 A1* 9/2016 Rao ................... G06F 16/2477
2017/0004158 A1* 1/2017 Faerber ............. G06F 16/24553

* cited by examiner

FIG. 4A

| Date | From Name | From Email | To Name | To Email |
|---|---|---|---|---|
| 06-27-2002 | Jack | Jack@email.com | Mike +2 | Mike@email.com +2 |
| 04-23-2002 | Ted | Ted@email.com | Mike +1 | Mike@email.com +1 |
| 04-16-2002 | Mark | Mark@email.com | Mike | Mike@email.com |
| 04-11-2002 | Jack | Jack@email.com | Mike | Mike@email.com |
| 04-10-2002 | Chris | Chris@email.com | Mike +1 | Mike@email.com +1 |
| 04-05-2002 | Lot | Lot@email.com | Mike | Mike@email.com |
| 04-04-2002 | Jack | Jack@email.com | Mike | Mike@email.com |
| 04-03-2002 | Dave | Dave@email.com | Mike | Mike@email.com |
| 03-26-2002 | Rob | Rob@email.com | Mike | Mike@email.com |
| 03-08-2002 | Walker | Walker@email.com | Mike | Mike@email.com |
| 12-17-2002 | Kim | Kim@email.com | Mike + 4 | Mike@email.com + 4 |
| 11-19-2001 | Van | Van@email.com | Mike +3 | Mike@email.com +3 |
| 11-13-2001 | Kim | Kim@email.com | Mike | Mike@email.com |
| 11-06-2001 | Jack | Jack@email.com | Mike +2 | Mike@email.com +2 |
| 11-05-2001 | Phil | Phil@email.com | Mike | Mike@email.com |

Data Source A — 150,000 Emails
Data Source A — 150,000 emails
Data Source B — 30 Transactions
Data Source C — 90 Records
Data Source D — 1,500 Employees 401, 405, 407

Board Meeting Minutes #123456.docx ← 522
⊚ Username 1 is the top contributor

Document  Overview  Properties 3  Media 2  Links 43 ← 526

Board Meeting Minutes #123456

The Board of Directors

Lubbock,TX
Jan 1, 2000         524

Heading 1

Transcript text: We are talking about this deal here in Lubbock, TX.

Secretary#123456 was asked if a quorum was present.

Secretary#123456: Yes  525

On 01/01/2000 the Business conducted a meeting with Secretary #123456 at the Office.

Secretary#123456: The board called the meeting to order. As the first order of business, it was recorded at 10:00 am at the Office on 12/11/1999 the officer saw John Doe and Jane Doe sign a contract #123ABC. John Doe gave a check to Jane Doe.

🏷 Document Tags

🕐 10:00 Dec. 11, 1999
Time

📄 Contract #123ABC
Document

📅 Jan. 1, 2000
Date

🌐 Lubbock, TX
Place

🌐 Office in Lubbock, TX
Place

👤 John Doe
Person

👤 Jane Doe
Person

View all →

Board Meeting Minutes #123456.docx
⊙ Username 1 is the top contributor
Document  Overview  Properties 3   Media 2   Links 43

≡ Properties   542

File Name – File path / Board Meeting Minutes #123456.docx

View all 1 →

Media   544

| Board Meeting Minutes #123456.wav | Board Meeting Minutes #123456.docx |

546

View all 2 →

📄 Document Excerpts

"John Doe and Jane Doe sign a contract #123ABC"
In Board Meeting Minutes #123456

"John Doe gave a check to Jane Doe."
In Board Meeting Minutes #123456

× Linked Objects   548   ⓘ

Places(2)

Linked to  🌐  Lubbock, TX Place

Linked to  🌐  Office in Lubbock, TX Place

Events (3)

Linked to  📅  Meeting #123456.docx

📅  Dec. 11, 1999 Time

View all 43 →

| | | | |
|---|---|---|---|
| 6/27/2017, 12:20:20 PM | | | |
| Board Meeting Minutes #123456.docx | | | |
| ⓐ Username 1 is the top contributor | | | |
| Document   Overview   Properties 3   Media 2   Links 43 | | | |
| Showing | All ▽   Entities ▽ | Events ▽ | Documents ▽ |
| Entities | | | ⓘ |
| Linked to | 📄 | Check | Document |
| Linked to | 🌐 | First National Bank | Bank |
| Linked to | 👩 | Jane Doe | Person |
| Linked to | 👨 | Banker | Person/ Phone Contact |
| Linked to | 📅 | Dec 11, 1999 | Date/Event |
| Linked to | 🌐 | Palo Alto, CA | Location |
| Linked to | 🌐 | El Paso | Location |
| Linked to | 🌐 | Office in Lubbock, TX | Location |
| Linked to | 📄 | Contract #123ABC | Document |

| | Explore | Details | Column Stats | Entities |
|---|---|---|---|---|
| Employee Type | | | | |
| Full Name | | | | |
| Employee Location | | | | |
| Palo Alto, CA | | | | |
| Employee Number | | | | |
| 100010 | | | | |
| Full Name | | | | |
| Jane Doe | | | | |
| Workday Username | | | | |
| janedoe | | | | |
| Workday Department | | | | |
| Engineering Workday | | | | |
| Rate Software | | | | |
| Engineer Tenure in | | | | |
| Months | | | | |
| 138 | | | | |
| ★ Project Codename | | | | |

| Business Area | Result Count | Sum Tenure in Months | Average Tenure in Months | Minimum Tenure in Months | Maximum Tenure in Months |
|---|---|---|---|---|---|
| EXTERNAL | 222 | 5,328 | 24 | 0 | 72 |
| INTERNAL | 333 | 8,658 | 36 | 0 | 112 |
| PRODUCTION | 444 | 21,312 | 48 | 1 | 150 |
| RESEARCH | 555 | 6,660 | 12 | 0 | 48 |
| DEVELOPMENT | 666 | 39,960 | 60 | 4 | 200 |
| OTHER | 777 | 55,944 | 72 | 0 | 215 |

FIG. 6A

MULTI-DATABASE DOCUMENT SEARCH SYSTEM ARCHITECTURE

INCORPORATION BY REFERENCE TO ANY PRIORITY APPLICATIONS

This application is a continuation of U.S. patent application Ser. No. 16/053,370, filed Aug. 2, 2018, and titled "MULTI-DATABASE DOCUMENT SEARCH SYSTEM ARCHITECTURE." The entire disclose of the above item is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to database configurations for processing, storing, tagging, indexing, and searching different types of data.

BACKGROUND

Data can be stored in a database, and searches can be performed on the data. However, as the amount of data increases, the searches can become proportionally slower, and some types of processing operations can become slower according to higher orders of mathematical difficulty. Processing and searching on vast amounts of data can take unacceptably long times.

SUMMARY

Some embodiments feature a fast-search system comprising: a document intake system configured to generate a plurality of objects and links between objects based at least in part on an ontology template; a first database configured to store the plurality of objects and links; a search system configured to build an index of the plurality of objects and links; a second database configured to log changes related to the plurality of objects and links, the changes being made after the index is built; and a document interface system configured to receive a user selection of a document. The search system is configured to search, with reference to the index, for objects linked to the document. The document interface system is configured to initiate a supplemental search of the second database for objects linked to the document and changes related to the objects linked to the document. The document interface system is configured to transmit data for displaying at least some results of the supplemental search.

The system can feature any combination of the following: the changes in the second database are configured to be written to the first database; the supplemental search of the second database for changes affecting the objects linked to the document includes changes that are not included in the first database at the time of the supplemental search; the search is performed using a scalable search technique; one or more data stores including at least 100,000 documents, wherein the document intake system is configured to generate the plurality of objects and the links between objects based at least in part on the at least 100,000 documents, and wherein the first database is separate from the one or more data stores; an auditing system configured to audit the changes, wherein the changes include edits or deletions, and wherein the changes in the second database are appended to the first database. The system can be further configured to search, with reference to the index, for links to the document and properties of the objects linked to the document, wherein the supplemental search of the second database includes searching for: changes to the document or properties of the document, changes in any links to the document, changes in any objects linked to the document, and changes in any properties of objects linked to the document.

Some embodiments feature a computer system for document review, the computer system comprising a computer readable storage medium storing instructions, and one or more processors configured to execute the instructions to cause the processors to: generate a plurality of objects and links between objects based at least in part on an ontology template; store the plurality of objects and links in a first database; building an index of the plurality of objects and links; log changes affecting the plurality of documents and links in a second database; receive a user selection of a document; perform a first search, with reference to the index, for objects linked to the document; perform a supplemental search of the second database for changes to the objects linked to the document; and transmit data for displaying search results determined based at least in part on the first search and the supplemental search.

The computer system for document review can feature any combination of the following: the changes in the second database are configured to be written to the first database; the second database is configured to delete the changes affecting the plurality of documents and links that are logged in the second database after the changes affecting the plurality of documents and links are written to the first database; searching the second database for changes that have not yet been written to the first database when the supplemental search is performed; one or more data stores including at least 100,000 documents, wherein the document intake system is configured to generate the plurality of objects and the links between objects based at least in part on the at least 100,000 documents, and wherein the first database is separate from the data store, and wherein the first database is separate from the one or more data stores; an auditing system configured to audit the changes, wherein the changes include edits or deletions, and wherein the changes in the second database are appended to the first database. In the computer system for document review, the first search can further include searching for: links to the document and properties of the objects linked to the document, and the supplemental search can further include searching for: changes to the document or properties of the document, changes to any links to the document, and changes to any properties of objects linked to the document.

Some embodiments feature a searching and indexing method comprising: generating a plurality of objects and links between objects based at least in part on an ontology template; storing the plurality of objects and links in a first database; building an index of the plurality of objects and links; logging changes affecting the plurality of documents and links in a second database; receiving a user selection of a document; performing a first search, with reference to the index, for objects linked to the document; performing a supplemental search of the second database for objects linked to the document; and transmitting data for displaying search results determined based at least in part on the first search and the supplemental search.

The searching and indexing method can include any combination of the following: the changes in the second database are configured to be written to the first database; performing a search of the second database for changes that have not yet been written to the first database when supplemental search is performed; the generating of the plurality of objects and the links between objects is based at least in part on the at least 100,000 documents; the first search is performed using a scalable search technique; and receiving the changes affecting the plurality of objects and links, wherein the changes include edits to a document, tag, object, object property, or link Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology.

Additionally, various embodiments of the present disclosure are inextricably tied to computer technology. In particular, some features such as processing and analysis of large amounts of electronic data are intimately tied to, and enabled by, computer technology, and would not exist except for computer technology. Some benefits, such as improved computing, storage, searching, indexing, and/or computing speeds, can be realized in computer-implemented embodiments. Some benefits derive from properties of database structure that have no analog in the human mind. Some embodiments can include particular computer search techniques that are not performed by people. Some parts of the disclosure enable computers to perform new operations that computers could not previously perform or at speeds that computers could not previously achieve.

Accordingly, in various embodiments, large amounts of data are automatically and dynamically processed in response to user inputs, and the calculated data is efficiently and compactly presented to a user by the system. Thus, in some embodiments, the user interfaces described herein are more efficient as compared to previous user interfaces in which data is handled using the architecture described herein.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, the particular layouts of user interfaces, including the arrangement of elements therein, the sequences of links to other interfaces, the interactivity with the user interfaces, and the hierarchy and organization of user interfaces, where appropriate, allow the user to comfortably review the large amount of data and to take advantage of humans' particularly strong pattern recognition abilities related to visual stimuli and intuitive decisions making processes.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 4A shows an example user interface for document interaction.

Figure 5A:
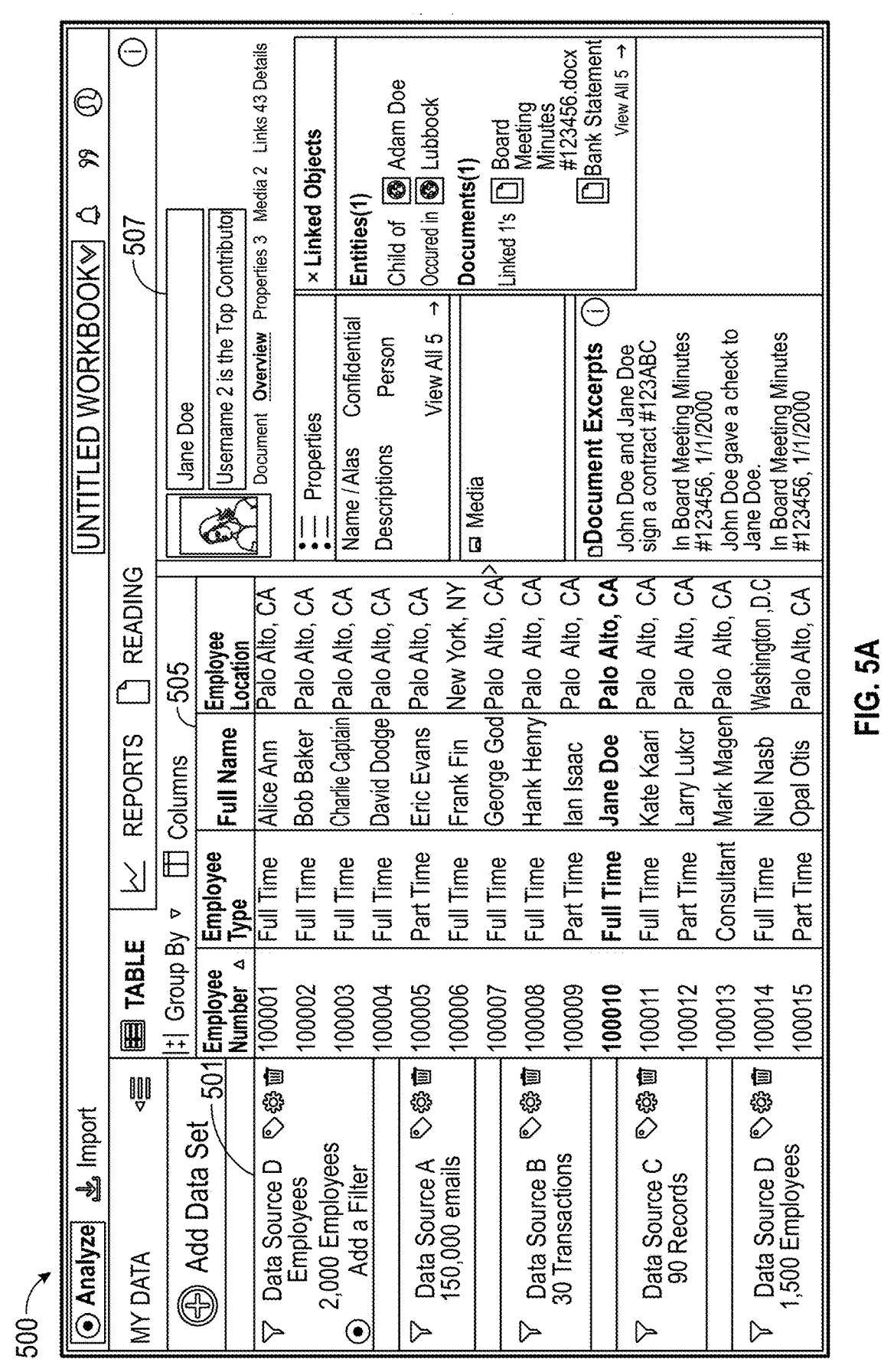

FIG. 5A shows an example user interface for document interaction.

FIG. 5B shows an example document viewer panel.

FIG. 5C shows an example document overview panel.

FIG. 5D shows an example document links panel.

FIG. 5E shows an example object properties interface.

FIG. 6A shows an example search result interface.

DETAILED DESCRIPTION

Overview

Figure 1:
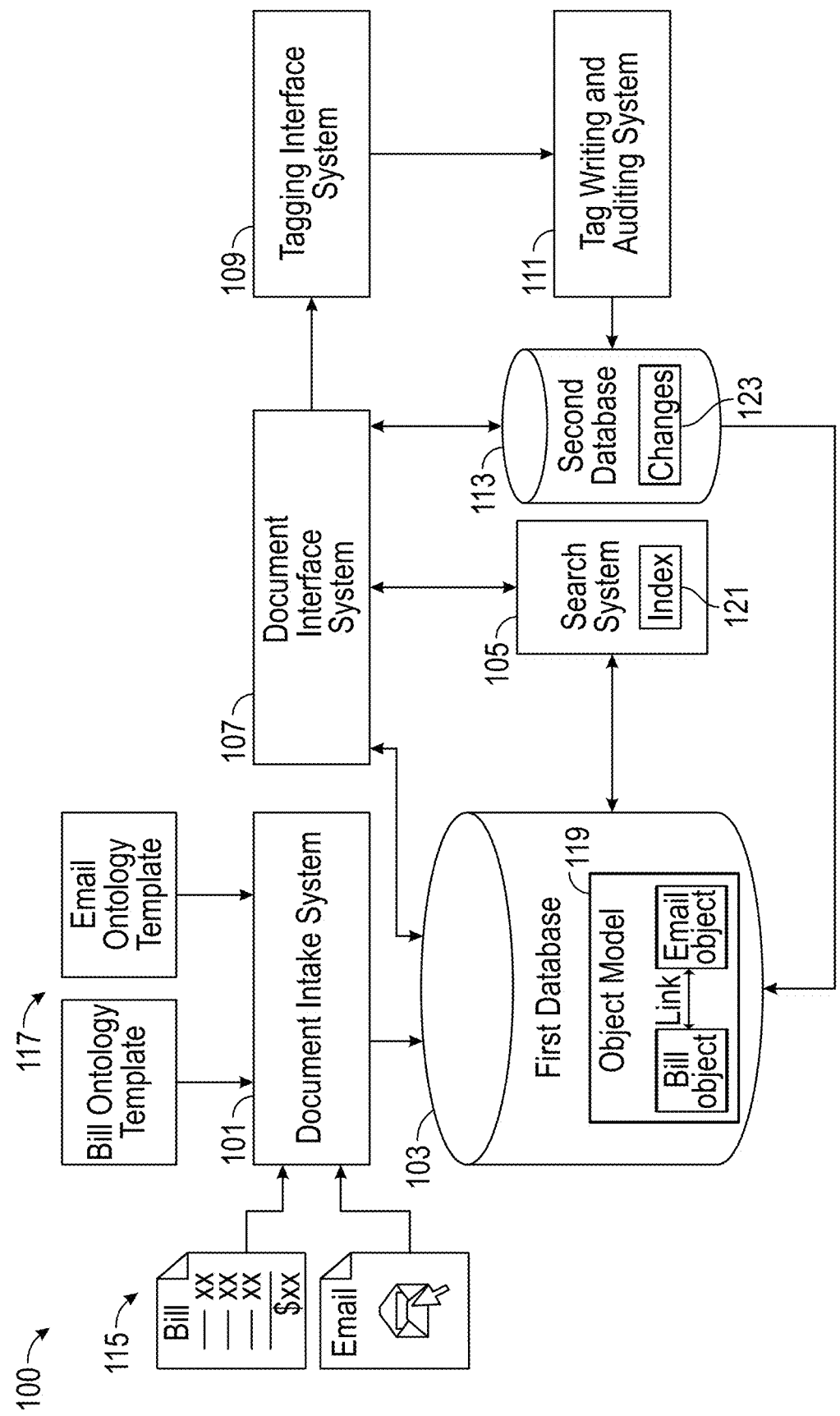
FIG. 1 shows an example architecture of a document database and review system.

Some projects involve the analysis of massive amounts of unorganized documents. A document review system can provide an interface for reviewing the large volume of documents. The interface can allow users to browse, select, search, filter, and tag/categorize documents. With the interface, a user can search for types of documents, view the documents, and tag the documents (e.g., as important, as responsive, as related to a first topic, related to a second topic). However, as the documents in the database become very voluminous, searching can take proportionally longer. In systems where thousands, tens of thousands, hundreds of thousands, millions, tens of millions, hundreds of millions, billions, tens of billions, hundreds of billions, or more documents are in a database, the search times can become impractically long. For example, a computer may take one second to search through one thousand documents. However, for a database of one million files, the search can take over 16 minutes. For a database of ten million files, a search at a speed of 1000 documents/second can take over two and a half hours to complete.

To reduce the search time, scalable search techniques can be used. Some search techniques can significantly reduce the search time by building an index. An example of a simple index is an alphabetized array. Other indexes can have different structures, such as a database structure, a mapping structure, a relational structure, a tabular structure, a tree structure, a node structure, etc. In some embodiments, the index can include a logical namespace which maps to one or more primary shards and can have zero or more replica shards. For example, the search of ten million files with reference to an index can reduce the search time from over two and a half hours down to only a few seconds or down to less than a second. However, building an index can take about as long as an unindexed search. If changes are made to a database, then an index can become stale or outdated. A search that references a stale index can return incomplete or inaccurate results.

To facilitate the review of documents, an ontology system can be used to determine objects and object properties based on documents and determine links that represent relationships between the objects. As new documents are added to a database, the objects, object properties, and links can change. The objects, object properties, and links can also change as users tag documents. The objects, object properties, and links can be searched to identify documents, related documents, and related information. The objects, object properties, and links can also be used to perform analysis.

A database that is frequently modified by adding/removing documents or changing objects, object properties, or links runs a risk of frequently having a stale index. The risk of having a stale index is increased if multiple users can simultaneously access and edit information in the database. Accordingly, searches for documents, objects, object properties, or links may return incomplete or inaccurate results. Based on the frequency of modifications, it may become impractical to update an index. For example, if an index takes about 2.5 hours to rebuild, then the rebuilt index can become stale before it even finishes rebuilding if modifications are made to a database more frequently than once per 2.5 hours. Under such circumstances, searches without the index may take too long, and faster searches based on the index may be incomplete or inaccurate. Some search techniques can take a long time to rebuild the index. Other search techniques, including search techniques that use multi-tenant-capable full-text search engines or other scalable search engines, can similarly take a long time to rebuild the index.

In some embodiments, a second database can be used to store information tracking modifications to a first database. The information in the second database can be significantly less than the information in a first database (e.g., half the size, at least an order of magnitude smaller) such that the second database can be searched much faster than the first database. An index of the first database can be periodically built after the tracked modifications to the first database that are stored in the second database are written through to the first database. In response to a user search, the system can perform a first search of the first database referencing the index and perform a second, supplemental search on the second database such that any unindexed modifications to the first database will be found by the supplemental search. The results of the first database can be combined with the results from the second database, and the combined results can be presented to a user through a user interface.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Example System Architecture

FIG. 1 shows an example architecture 100 of a document database and review system. The architecture includes a document intake system 101, a first database 103, a search system 105, an interactive document interface system 107, a tagging interface system 109, a tag writing and auditing system 111, and a second database 113. Documents 115 and ontology templates 117 can be provided to the document intake system 101. The documents 115 can be stored in the database, as well as an extracted object model 119. A search index 121 can be built for the documents 115 and model 119 in the first database. The second database 113 can track changes 123 to data in the first database 103. The changes 123 can include modifications, new data, deletions, etc. In some embodiments, the information (e.g., documents and object model) stored in the first database can be split among a plurality of databases. In some embodiments, the second database can be a PostgreSQL database or other object-relational database.

The document intake module 101 uses model extraction templates to develop object models 119 based on the information in documents 115. Examples of documents 115 can include pictures, bills, emails, letters, receipts, transactional forms, contracts, etc. An ontology template 117 can be provided for each type of document 115 such that objects and links can be extracted from that type of document. The ontology template 117 can include computer-implemented instructions for how the object model 119 can be developed. The document intake system can process the documents 115 according based on the appropriate model extraction template 117.

The document intake module can, for example, receive DAT files, archives, database files, or export files that include a plurality of documents, such as word documents, images, portable document format (PDF) files, transaction documents, medical records, etc. For example, in processing a DAT, individual documents can be extracted, optical character recognition can be performed on the individual documents, metadata can be read or generated, etc.

For example, an ontology template 117 for an email can include instructions to create a new email object and create new person objects for each person listed in a "to," "from," or "copy" field if those person objects do not already exist. The email ontology template can also include instructions to set the name property and an email address property of the people objects based on sender and recipient information fields of the email. The ontology template for an email 117 can also be used to link email addresses as properties of each person object, as well as link the person objects to the email. The ontology template 117 for the email can also be used to create links based on the date of the email. The ontology template 117 for the email can also be used to determine new links, properties, and/or objects based on information in the body of the email.

For example, a bill 115 can be a bill to John Doe for services provided by Acme Corp. An ontology template 117 for a bill can include instructions to create a new bill object, a new person object for John Doe (if the person object does not already exist), and a new business entity object for the Acme Corp. The ontology template for the bill 117 can also be used to link addresses listed on the bill to either the John Doe person object or the Acme Corp. business object. The ontology template 117 for the bill can also be used to create event objects based on the services listed in the bill, and link the event objects with their respective service dates listed in the bill. The ontology template 117 for the bill can also create a billing link between the John Doe object and the Acme Corp. business object. The ontology template 117 for the email can also be used to determine new links, properties, and/or objects based on information in the body of the email. The document intake module 101 can, based on the ontology template 117 and the bill, create data formatted for storage in the first database 103. In some embodiments, the document intake module can perform optical character recognition (OCR) of an underlying document.

In some embodiments, links can be generated between objects that have matching properties. For example, in a first email, John Doe includes his street address, and a second document is a bill sent to John Doe's street address but does not mention John Doe by name. Based on the email, an object can be created for John Doe such that a property (the address) of the object is the street address. Based on the bill, a bill object can be created, and a property (the mailing address) of the bill can also be the street address. Based on the matching address properties, a link can be created between the John Doe object and the bill object.

A first database 103 can store data including the documents 115 and an object model 119. The documents 115 include copies of the documents themselves, as well as any metadata or tags. The object model 119 in the first database can include a plurality of objects, properties of the objects, and links between the objects. The objects, object properties, and links can be determined, at least partially, by the document intake system 101. In some embodiments, the documents 115 and object model 119 can be stored in separate databases. In some embodiments, the first database 103 can be a relational database.

A search system 105 is configured to search the first database 103. The search can include finding documents, types of documents, text in documents, documents having particular metadata, objects, object properties, links, etc. For example, a search can be performed using a date range filter for emails sent or received by a certain person. As another example, a user can search for all documents created in the year 2015 and have the word "case" and "sold." A user can also search the first database 103 for documents associated with certain tags. For example, the user can search for all documents tagged as "unread" and "responsive" and "important." Accordingly, the search system can be used as a filter to provide a subset of documents (or objects, object properties, or links) that match a search or filter criteria.

A user can also search the first database 103 based on objects, object properties, and links. For example, the user can search for all people or businesses who received a payment from John Doe. This can cause the first database 103 to return a search result that would include Acme Corp. based on the billing link between the John Doe person object and the Acme Corp. object.

The search system can build an index 121. The index can be a data structure that facilitates searches of documents, objects, object properties, or links. Indexes can be alphabetical, numerical, list format, tree format, node format, category format, etc. Searching an index for an indexed property can cause the search to perform very quickly, and in some cases, orders of magnitude faster than searching the first database. The search system can be configured to periodically (or in irregular intervals or in response to conditions or triggers, as described herein) rebuild (either update or from scratch) the index. Because rebuilding the index can take time, the index can be rebuilt during low-demand hours (e.g., at night), after certain intervals (e.g., at least once every 12 hours), or if a certain amount of changes have been made (or are waiting to be written to) to the first database (e.g., more than 100 GB of data added or modified, more than 10,000 changes).

An interactive document interface system 107 is configured to receive user inputs for performing searches and for displaying documents 115. The document interface system 107 also provides data for display the documents and search results. For example, a user can select a document 115 to view. The document interface system 107 can access a copy of the document 115 or image of the document 115 and cause the document 115 or image thereof to be displayed. In some embodiments, the document 115 can be stored in a local data store, and in some embodiments, the document 115 can be stored in a remote data store that is accessed through a network such as the internet. In various embodiments, the documents can be stored together with or separately from the first database 103. In various embodiments, the document can be displayed in various view formats, such as an image, opened and displayed through a native program or viewer, as a TIFF, as a scan, etc. A second database 113 can also be accessed to determine if a document has been modified (e.g., has new tags) and if so, the modifications can be displayed (e.g., the new tags can be shown).

When the document interface system 107 receives a search, the document interface system 107 can access the search system 105 to perform the search based on the index 121. The search system 105 can return the search results (e.g., a matching document, matching objects, matching object properties, matching links). In some embodiments, additional details of the search results (e.g., contents and metadata of the matching document) can be retrieved by accessing the document 115 from the data store that the document 115 is stored in, and the additional details can be displayed by the interactive document interface system 107.

When the document interface system 107 receives a search, the document interface system 107 can also search the second database 113 to supplement the result provided from the search system. The second database 113 can include unindexed changes 123. Accordingly, results from the second database 113 can be searched (in some embodiments, using an unindexed search) to supplement search results from the search system such that additional results can be provided or stale search results can be invalidated. The interactive document interface system 107 can quickly display accurate search results in response to a search request. In some embodiments, the search system 105 can perform the supplemental search of the second database 113. In some embodiments, the search system 105 and the interactive document interface system 107 can be implemented together on the same hardware.

A tagging interface system 109 is provided to allow users to add tags to documents. The tags can include labels associated with objects, object properties, or links. For example, a user may tag "J. Doe" in a document as "John Doe" based on the context of the document, causing the document to be linked to the John Doe object. As a result, a separate object for "J. Doe" can be deprecated or linked to as an alias of John Doe. The tag, the tagged portion of the document, the new link to the alias of John Doe, or the deprecation of the J. Doe object can be stored as changes 123.

A tag writing and auditing system 111 can track which users makes which modifications to which documents at what times. The auditing system 111 can log or track what modifications (e.g., additions or deletions) are being made to an object or document, including what information is coming from a source and what information is being added to a target. A copy of a document that is being edited can be transmitted to the tag writing and auditing system.

In some embodiments, auditing can include logging document check ins/check outs, viewing, modifying, printing, sharing, etc. In some embodiments, auditing can include a changelog and/or previous versions of a document. The tag writing and auditing system 111 can, based on the modifications received through the tagging interface system 109, determine information to be written to the first database 103 to cause the modifications to be registered.

However, writing the modifications to the first database 103 changes the underlying documents, which can cause the index 121 to become stale. The modifications to be written to the first database can be cached in a second database 113 as changes 123. In some embodiments, the changes 123 can include computer instructions for writing the modifications to the first database or higher-level descriptions of the modifications. In some embodiments, the changes 123 can also include a data structure configured to facilitate searches, such as a second index. For example, the changes 123 can identify which documents, objects, object properties, or links are being modified (e.g., deleted, changed, or added to) such that the information in the first database is stale. Any search result that is marked as stale in the change 123 information can be analyzed to determine if the search criteria is still met after the changes. Additionally, the search results from searching the first database can be supplemented with additional search results based on the changes 123 in the second database.

The changes 123 in the second database 113 can be periodically written to the first database 103. This can occur, for example, ever few hours, every night, after a certain number of modifications have accumulated (e.g., 1,000 modifications or 1 GB of changes). When written to the first database 103, the changes 123 can be appended to data in the first database 103. After the changes 123 are written to the first database 103, the index 121 can be rebuilt to reflect the newly written information. Additionally, the changes 123 can be flushed from the second database 113 after they are written to the first database 103. In some embodiments, the second database 113 can be stored in a separate server, data store, or hardware from the first database 103.

Although the example in FIG. 1 shows a search system 105 configured to search the first database 103 and build an index 121 of the object model 119, it should be understood that, in some embodiments, the search system can also be configured to search a data store storing documents 115 and build an index (which can be integrated with index 121 or a separate index) for the documents 115 as the documents 115 are modified or new documents 115 are added to the data store. In some embodiments, objects of the documents 115 can be stored in the object model 119, and the object model 119 can be searched and indexed.

Object-Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
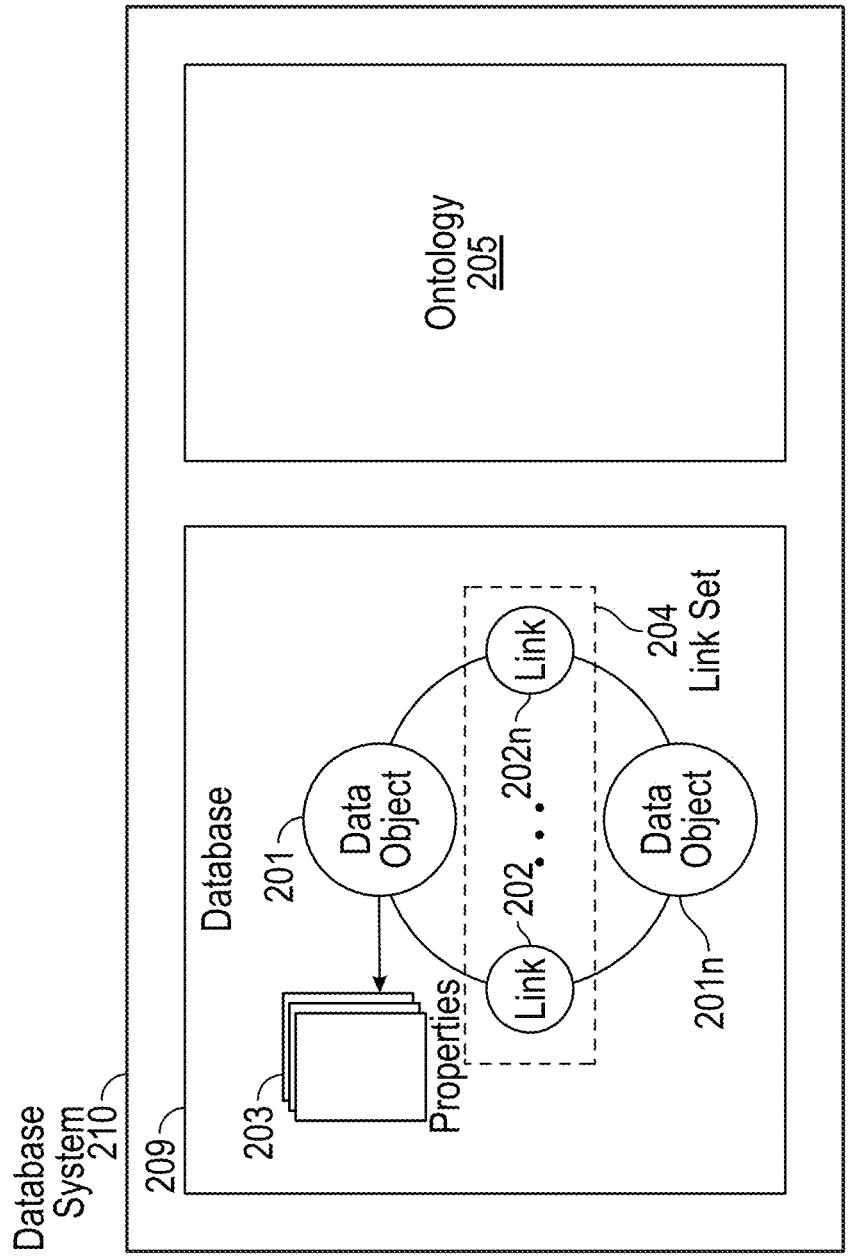
FIG. 2 shows an example of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article.

Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
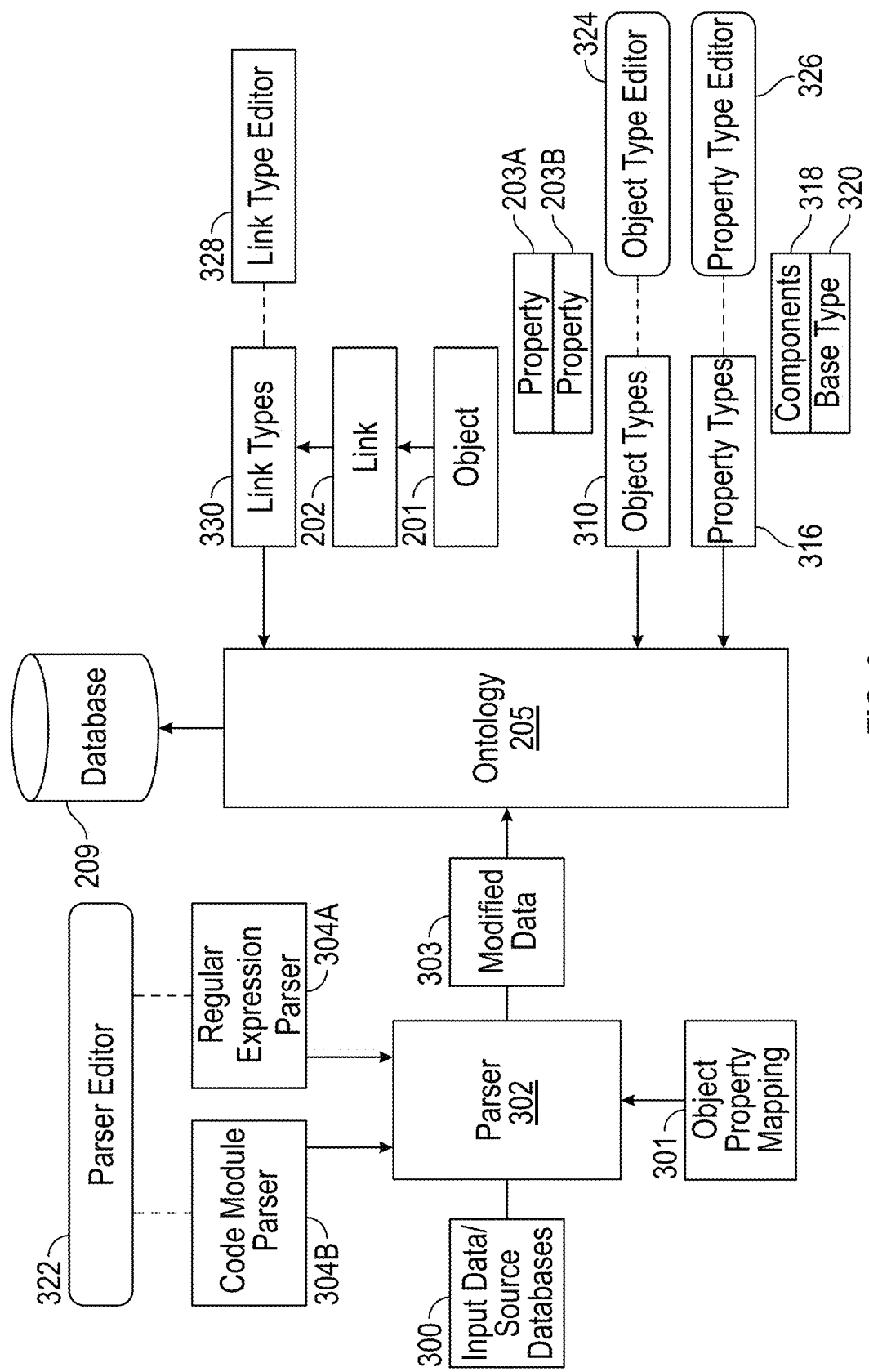
FIG. 3 shows an example of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

The properties, objects, and links (e.g. relationships) between the objects can be visualized using a graphical user interface (GUI).

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 103 may be searched using an interface 107 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data in a more analytically useful way. Graphical user interfaces allow the user to visualize otherwise obscure relationships and patterns between different data objects. The present disclosure allows for greater scalability by allowing greater access and search capabilities regardless of size. Without using the present disclosure, observation and use of such relationships would be virtually impossible given the size and diversity of many users' present databases, (e.g. excel spreadsheets, emails, and word documents).

Example User Interface for Emails

FIG. 4A shows an example user interface 400 for document interaction. The user interface 400 includes a first menu 401 listing a plurality of available data sources, viewing panel 405 for listing documents in a data source or displaying search results, and a document viewing panel 407.

A user can select a data source from among a plurality of data sources. Each data source can include a collection of documents. There can be different data sources for different types of documents, for different cases, related to different investigations, etc. Some data sets can include multiple types of documents (e.g., emails, bills, receipts, transaction records, letters). In some embodiments, data sources can be grouped by collection topic, such as financial data, test data, data relating to a geographic region, medical data, transaction data, emails, phone calls, cases, investigations, etc. Some data sets can be very large and include over 10,000; 100,000; 1,000,000; 10,000,000; 100,000,000; or 1,000,000,000 documents. In FIG. 4A, the data source labeled "Data Source A" is selected.

The documents included in the selected data set can be displayed in the viewing panel 405. The information presented in the viewing panel 405 can vary based on the type of documents included in a data source. In the example shown in FIG. 4A, the documents are emails, and the header row includes metadata fields "Date," "From Name," "From email," "To Name," and "To Email" that are displayed for emails. Other fields, such as whether or not an email has an attachment, the time received, CC and BCC fields, file size, and other metadata or properties of the email can also be displayed. When viewing collections of other types of documents, other fields can be shown in the header row, such as shown in FIG. 5A.

The documents within Data Source A can be searched. A user can use a search menu to search for documents that satisfy certain criteria. The search criteria can include text matching. The search criteria can also be used to filter based on document metadata, such as date ranges, file sizes, To/From/CC/BCC fields, etc. A search menu can provide a list of fields that can be searched. In the example shown, the "To" field of an email is being searched for "Mike." A list of emails satisfying the search criteria are listed in the viewing panel 405.

The results of the search can be provided quickly, even when a very large volume of documents are searched, and even if documents, objects, object properties, or links are searched. The architecture described in FIG. 1 can be used such that the search is processed using an index 121, the metadata of the search results can be retrieved from the index or the first database, and the search results can be supplemented or corrected by also searching the second database. Accordingly, the user interface can quickly and responsively provide search results even when the number of documents searched is very large.

The document viewing panel 407 can display different information based on the type of document that is selected. For example, the layout shown in FIG. 4B can be used for displaying emails. For other types of documents, different layouts can be used. The document can be viewed natively, as an image, as optical character recognition (OCR) extracted text, etc. In some embodiments, the different views can be displayed side by side (e.g., the OCR text can be displayed beside a TIFF image).

Figure 4B:
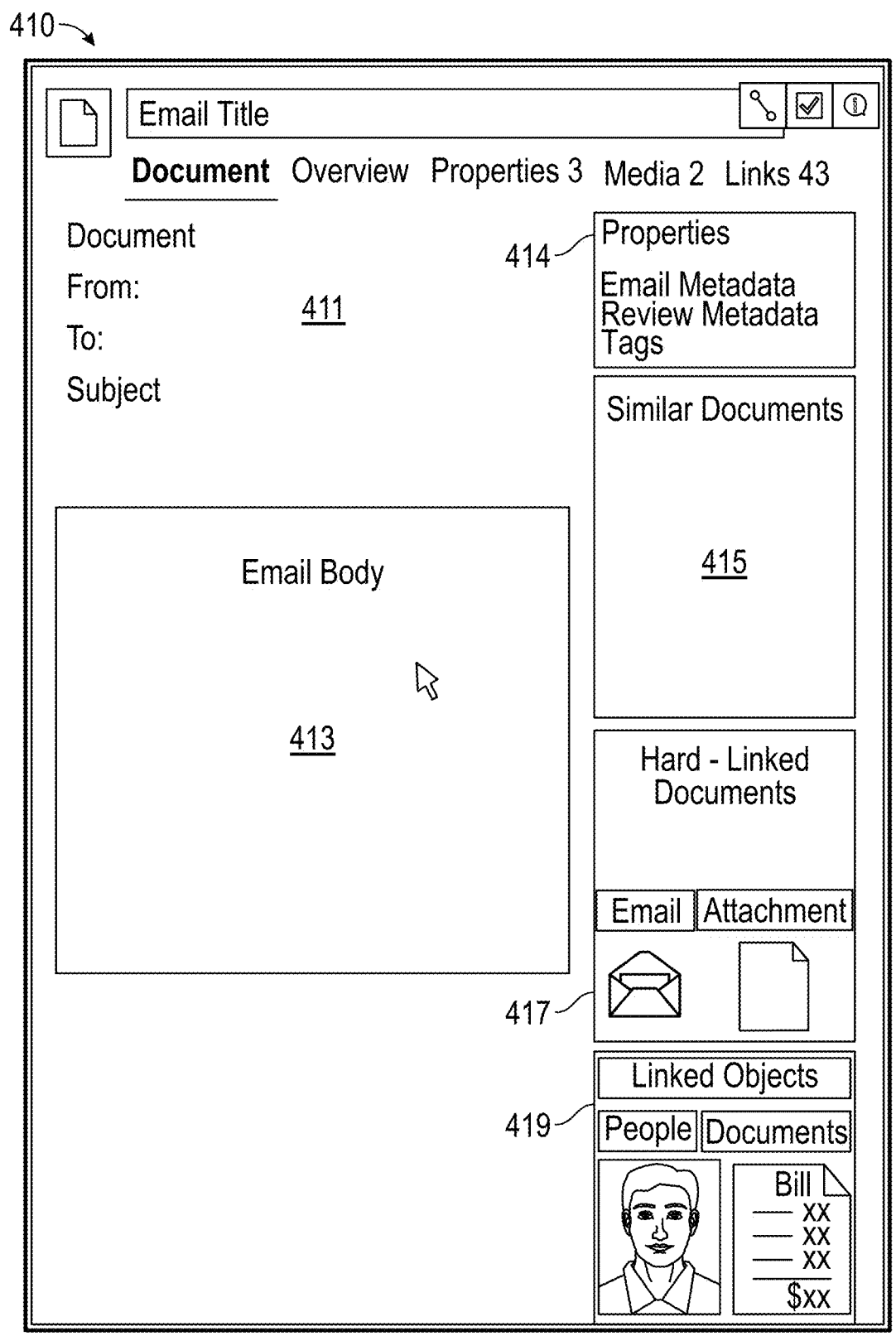
FIG. 4B shows an overview layout that can be presented in the document viewing panel of FIG. 4A for an email.

FIG. 4B shows an overview layout 410 that can be presented in the document viewing panel 407 of FIG. 4A for an email. The overview layout 410 includes a metadata display section 411, an email body display section 413, a metadata editor 414, a similar document list section 415, hard-linked documents section 417, and links section 419.

The metadata display section 411 can show information such as the time, subject, To/CC/BCC fields of an email. The email body display section 413 can display a preview of the contents of a body of an email.

The metadata editor 414 can be used to view or edit metadata or tags associated with the email. Metadata can include the email metadata and review metadata. Email metadata can be native to an email file, such as a file size, the date the email was sent, etc. Review metadata can be added by the document review system. For example, review metadata can include tags such as whether a document has been reviewed and whether the document is important, confidential, responsive, etc. In some embodiments, tags or metadata can be stored in the first database 103 as a property of a document object.

A similar documents list section 415 can list or indicate related emails. This can include, for example, other emails in a thread, duplicate documents, etc. Other emails in a thread can be identified, for example by matching subject lines, comparing senders and recipients, and tracking the chain of sent and received emails. Other ways that threads can be identified include matching thread identification numbers, MD5 hashes, or body text.

Hard-linked documents 417 can also be displayed. In some cases, a first hard hard-linked document can include a native link to a second document. In some cases, a first hard-linked document can be specified as linked to a second document when the first and second documents are imported to the document intake system 101. For example, a PDF file can be hard-linked to the email if email metadata indicates that the PDF file is an attachment of the email. The hard-link can sometimes exist as metadata. Some documents can be hard-linked to each other based on matching titles, subjects, editors, etc. Some hard links between documents can be identified by the document intake system 101 without relying on an ontology template 117.

Additional links and linked objects can also be shown in the links section 419. The additional links can be determined based at least in part on the ontology templates 117. For example, for an email referencing John Doe as a sender or recipient, the links section 419 can display icons or a list indicating the person object for John Doe and other objects that are linked to the John Doe person object, such as a bill that was sent to John Doe. An object linked to the email (e.g., by being mentioned in the email) can be linked to any number of other objects. For example, an email address can be linked to a person object, which can be linked to phone numbers, addresses, bank accounts, etc. In some embodiments, the links section 419 can show sections, previews, excerpts, icons, etc. from or representing the linked objects. A user can click on the linked object to see an overview or details of the linked object. The linked objects can be linked through multiple other objects. For example, an email sent by John Doe can include John Doe's address in his signature block, and a separate bank statement can be sent to John Doe's home address without stating John Doe's name. The links section 419 can display the bank statement as a linked object to the email due to the matching address properties, even though the bank statement does not mention John Doe's name.

By displaying linked and hard-linked documents (or objects or properties or links), users can select the linked document to cause additional information about the linked document to be displayed, a user can more easily investigate related events or topics. For example, after reading the email sent to John Doe, the user can then click on other linked documents that are linked to John Doe and then tag those other linked documents as relevant, important, etc. while the user's attention is focused on John Doe and while the context of the email is fresh in the user's mind. Otherwise, if documents are presented to a user for review in a different order (e.g., an unlinked sequential order), the user's attention might not necessarily be focused on John Doe and the user might not have the context of the email in mind by the time the next document related to John Doe appears later in the document review process.

A system can automatically determine the links to display in the links section 419 when a user selects a document or object from the viewing panel 405. In response to the user selection, the system can search for all links to the selected document using the search system 105 and the index 121. In some embodiments, this can include searching a database of hundreds of thousands, millions, or billions of documents. With computer technology, the links based on one selected document can be determined very quickly (e.g., about 1 second or less) or in a practical amount of time (e.g., a few seconds or less), even for databases with the very large amounts of documents. Using some search techniques, a one-to-many search for linked documents (or objects or object properties or links) can be performed relatively quickly. For example, the selected document can be compared against 50 million documents in a database to find linked objects. In some embodiments, each of the linked objects can also be compared against the 50 million documents to determine further linked documents, and so on, up to a reasonable number of times without impractically slowing the user experience. The link analysis of one-to-may documents to determine links can be performed quickly if certain types of scalable search techniques are used. A fully developed index of links for between all documents (e.g., many-to-many) in a database can be computationally expensive and take an impractically long time to complete. In some situations, a many-to-many link analysis can take too long to use in a responsive user interface.

After the links are determined by the search system 105, the result can be supplemented or corrected by analyzing the second database to see if any changes have been made that would change or add to the search result. The links from the supplemented search result can then be displayed in the links section 419.

In some embodiments, the system can be configured to automatically generate an alert to a user when a new document is linked to an object of interest, or when new information (e.g., the changes 123) causes a new object to be linked to the object of interest, or when a property of the object of interest changes, etc.

Example User Interface for Other Objects

FIG. 5A shows an example user interface 500 for document interaction. The user interface 500 includes a first menu 501 listing a plurality of available data sources, viewing panel 505 for listing documents in a data source or display search results, and an object overview panel 507.

In FIG. 5A, the data source labeled "Data Source D Employees" is selected. The viewing panel 505 is configured to show properties of employees, such as their employee number, employee type, name, and location.

The object overview panel 507 is configured to display information about an employee. Information about employees can be stored as data objects in the object model 119 in the first database 103. The employee data object can inherit properties of the person data object. The employee data object can have properties such as a name, employee number, employee type, and employee work location. These properties can be displayed in the object overview panel 507.

An example employee, Jane Doe, is selected. The object overview panel 507 displays an overview of properties of Jane Doe. The object overview panel 507 can also display other objects and documents that are linked to Jane Doe. Selecting one of the linked objects can cause the linked object to be displayed in the object overview panel 507.

The linked objects can be determined according to the ontology, and the related documents and objects can be retrieved for display from the object model 119 in the first database or the index 121. This can greatly aid investigations and highlight relationships that would often be missed by a human document reviewer due to the sheer amount of documents. For example, when people perform a document review project with a large volume of documents such as 10,000 or more documents, groups of documents are often split and assigned to different people to review (e.g., 100,000 documents split among 10 people to review). A first person might receive and review a group of files that include Jane Doe's employee profile. A second person might be assigned to review a different collection of 10,000 documents that includes meeting minutes associating Jane Doe with John Doe. The first person will be oblivious to Jane Doe's relationship with John Doe. The second person will be oblivious to Jane Doe's association with her employer. Even in circumstances where one person happens to be assigned a collection of 10,000 documents including both Jane Doe's employee profile and the meeting minutes, that person may nonetheless miss the link between Jane Doe, her employer, and John Doe. This can happen the two documents related to Jane Doe are separated by a large amount of intermediate documents. For example, a person who initially reviews Jane Doe's employee profile may continue the document review process for many hours or many days and review another 9,000 documents, forget about Jane Doe's association with her employer, and then review the meeting minutes linking Jane Doe with John Doe. Accordingly, the object model database can display the links of objects determined based on an analysis of an entire collection of documents in a data source such that a document reviewer can see linked objects in context.

The object overview panel 507 can also display documents linked to Jane Doe, such as her bills and meeting minutes in which she is mentioned. Because these links to other properties and documents are displayed, a user reviewing the collection of documents can notice that it is abnormal for Jane Doe, an employee, to be associated with board meeting minutes if other employees are not similarly linked to board meeting minutes. The user can then click on the board meeting minutes to investigate Jane Doe based on this abnormality.

In some embodiments, the user interface can be configured to automatically flag these types of abnormal links. For example, many employee objects can be linked to many other records, such as a bill or bank statement. However, Jane Doe's link to contract #ABC123 as recorded in Board Meeting Minutes #123456 can be unique or at least uncommon among employees. Based at least in part on a comparison of Jane Doe's links to links in a normalized cohort of employees, any unusual links of Jane Doe can be indicated.

The object overview panel 507 can also include excerpts of documents in which Jane Doe is mentioned. The object overview panel 507 can also include media (e.g., recordings, picture, videos, etc.) linked to Jane Doe.

Clicking on a linked object or document can bring up additional information about the linked object or document. For example, clicking the icon or title for the Board Meeting Minutes in the panel 507 can cause details to be displayed for the Board Meeting Minutes, such as shown in FIG. 5B. Clicking on the details tab in the panel 507 can cause additional details about the selected employee to be displayed, such as shown in FIG. 5E.

FIG. 5B shows an example document viewer panel 520. A user can, through an example user interface 500 such as shown in FIG. 5A, select a data source and then select a document within selected the data source. In response to the user's selection of the document, the document viewer panel can be displayed (e.g., in place of the object overview panel 507 in FIG. 5A). The document viewer panel 520 can also appear, for example, in response to a user selection of a linked document, such as the Board Meeting Minutes in panel 507 of FIG. 5A. The example document viewer panel 520 includes a document metadata display section 522, a document body display section 524, tag indicators 525, and a document tag display section 526.

The metadata display section 522 can display metadata about the document, such as the title, the author, edit history, etc. In some embodiments, the metadata can include a name associated with a user who made the most edits.

The document body display section 524 can include the text, pictures, and/or other content of the document. In various embodiments, the body can be displayed natively or as an image.

Portions of the document (e.g., parts of the text, images) can be selected by a user and then tagged, linked to an object, identified as an object, or set as an object property. Tagged portions of the document can be indicated with highlights 525, styling, etc. Users can select text and add tags associated with the selected text. The document can be automatically parsed to associate text with known objects and/or create objects based on the text. For example, people objects can be created based on the names "John Doe" and "Jane Doe" in the text if those people objects do not already exist in a database (e.g., in database 103 of FIG. 1). If the database 103 already includes people objects having name properties that match the text, then the document can automatically tag the matching names (e.g., John Doe or Jane Doe), create tags in the document, and link the John Doe object or the Jane Doe object to the document. In some embodiments, a menu can be displayed such that a user can indicate whether a tag, link, object, or object property should be edited or created based on the selected portion.

The document tag display section 526 can list the tags in the document. In some embodiments the document and tags can be represented using an object model. A document can be stored as an object, and tags of the document can be stored as object properties. When a document is selected for display, the document object's properties can be accessed to determine which tags to display in the tag display section 526.

The tags can be linked to objects or properties of objects. For example, there can be a document object, and the contract #123ABC can be a property of the document object. Date, times, events, people, things, locations, etc. are examples of portions of a document that can be tagged and listed in the document tag display section 526. Different icons can indicate different types of objects.

The tagging interface system 109 of FIG. 1 can provide an interface for portions of documents to be tagged. A user can, for example, select a portion of the document, and in response, the tagging interface system 109 can cause a menu to be displayed. The menu can allow the user to enter details about the tag (e.g., whether the tag is for an object or an object property) as well as allow the user to disambiguate which object the tag refers to (e.g., by listing identities of objects that closely match the user-selected portion of the document or user-input name).

The tag writing and auditing system 111 of FIG. 1 can track the tags that are added or edited by a user. As a result of an added or edited tag, changes can be made to an object model. For example, new links can be formed between existing objects, properties can be added to objects, new objects can be created, etc. As another example, when an address is tagged for a person object, and the address matches an address listed on a bill object, then a link can be automatically created between the person object and the bill object. The changes can be written to the second database 113.

FIG. 5C shows an example document overview panel 540. The example document overview panel 540 includes a document property display section 542, a related media section 544, excerpts of related documents 546, and a list of linked objects 548.

The document property display section 542 can display properties and metadata about the document. This can include, for example, a file path, a file name, a file creation time, an author, etc.

The related media section 544 can identify any media files that are linked or hard-linked to the document. The media files can be media files in a same data source as the selected document for which the overview is displayed. In some embodiments, the media files can additionally or alternatively display native version of files.

The excerpts of related documents 546 can include quotes from the document for which the overview is shown (e.g., the Board Meeting Minutes). Some quotes can be portions that reference other objects linked to the Board Meeting Minutes. Quotes can also be included from other documents that reference the Board Meeting Minutes. In some embodiments, the displayed excerpts can be tagged sections of the document or otherwise marked as an excerpt by a user.

The list of linked objects 548 can list the objects that are linked to the document for which the overview is shown. The linked objects can be categorized, such as into places, events, people, property, etc. Some links to objects can be based on tags, and the list of linked objects can change when the document tags are edited. The document interface system 107 of FIG. 1 can determine which objects to display in the list of linked objects based at least in part on the index 121 and object model 119. The document interface system 107 of FIG. 1 can also or alternatively determine which objects to display in the list of linked objects based at least in part on edited tags stored in the second database 113.

FIG. 5D shows an example document links panel 560. The document links panel 560 can include a list of linked objects. The document links panels 560 can include icons that represent a type of linked object, a name of the linked object, and an indication of the type of object that is linked. As discussed with respect to FIG. 5C, the list of objects linked to a document can dynamically change in response to edits of the document, and the list of linked objects can be determined based at least in part on an index 121, the object model in 119, and the changes 123 in the second database 113. Clicking on a link in the document links panel 560 can cause details or an overview of the linked object to be displayed.

FIG. 5E shows an example object properties interface 570. The interface can be shown in place of the panel 507 of FIG. 5. The interface 570 provides details about an employee selected through the interface 500. The details for displaying in the interface 570 can be properties of the employee object. In the example, the properties include an employee type, location, name, number, username, department, rate, tenure, and projects.

A user can select which of the panels shown in FIG. 5B, FIG. 5C, FIG. 5D, or FIG. 5E to display in place of the object viewing panel 507 or document viewing panel 407 shown in FIG. 5A and FIG. 4A, respectively, by selecting the desired viewing panel type in a menu at the top of the panel.

FIG. 6A shows an example search result interface. A selected data source (such as Data Source D, which includes a collection of employee profiles) can be searched for tags, objects, object properties, or links. Each employee can be represented with an object in the object model 119 of FIG. 1. Each employee object can have properties including a name, an employee type, tenure, a location, an employee number, a business area, a username, a group, projects that the employee is involved with, etc. Any combination of the properties can be displayed in the viewing panel 505 of FIG. 5.

A search can be performed on the objects in the selected data source based on tags, objects, object properties, links, or keywords. The results can be grouped and categorized based on any of the search criteria, and aggregate search results can be displayed. For example, an aggregate search results can be grouped by business area by selecting "business area" from an available grouping in the "Grouped by" menu. The "Grouped by" menu can display grouping options based on the properties of an object being grouped. Numbers of employee objects having a business area object property can be counted such that total numbers of employees in each business area are displayed. Each employee object can also have tenure as an object property. The tenure can be summed across all employee objects in each business area or averaged across the employee objects in each business area, and the results can be displayed. Similarly, the minimum and maximum tenures of employees in business areas can also be displayed. For other types of objects that have different types of object properties, different types of aggregate analysis can be performed. Although an example of aggregate analysis based on object properties is shown, similar aggregate analysis can be performed based on the tags (e.g., show a number of employee profiles tagged as "important" grouped from longest to shortest tenure) or links (e.g., show a list of profiles for employees who are linked with any emails that mention "event XYZ" and indicate how many times those employees are linked with such emails).

With reference to FIG. 1, the searches or aggregate analysis can be performed based at least in part with reference to an index 121. For example, a search system 105 can refer to the index to find employee objects. If additional information (e.g., their business area or tenure) about the employee objects are not available in the index, then the first database 103 can be accessed to retrieve additional information about the employee objects. The search can be supplemented or corrected based on information in the second database 113.

Figure 6B:
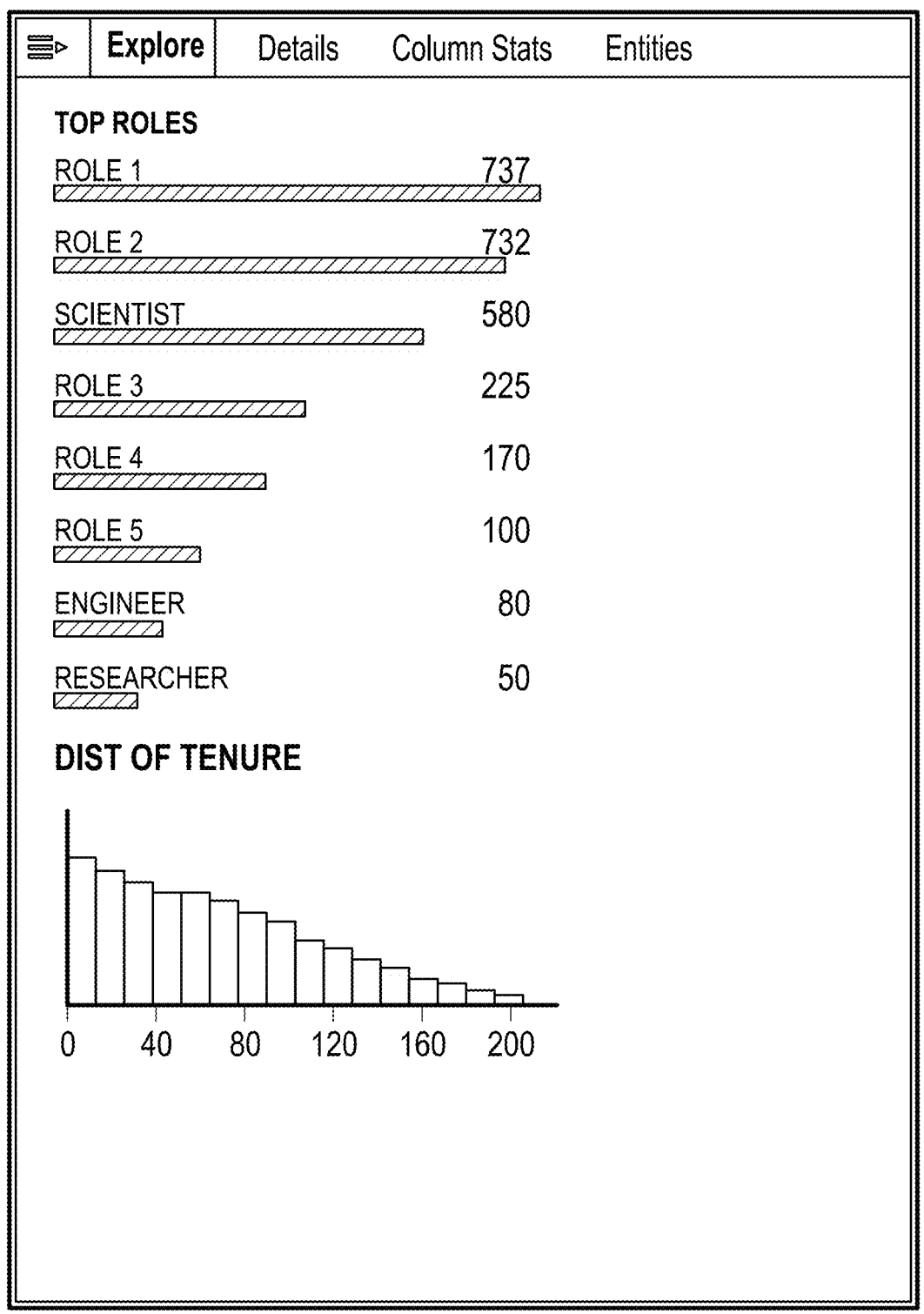
FIG. 6B shows another example interface displaying aggregate analysis search results.

FIG. 6B shows another example interface 650 displaying aggregate analysis search results. The interface 650 can be shown alongside the interface 500 (e.g., in place of panel 507). The search results in the interface 650 include aggregate analysis of employees categorized by role and arranged in decreasing order. The search results in the interface 650 also include a histogram of distributions of the tenure of employees. The search results shown in the interface 650 can be determined using the system in FIG. 1 as described with respect to FIG. 6A.

Figure 7:
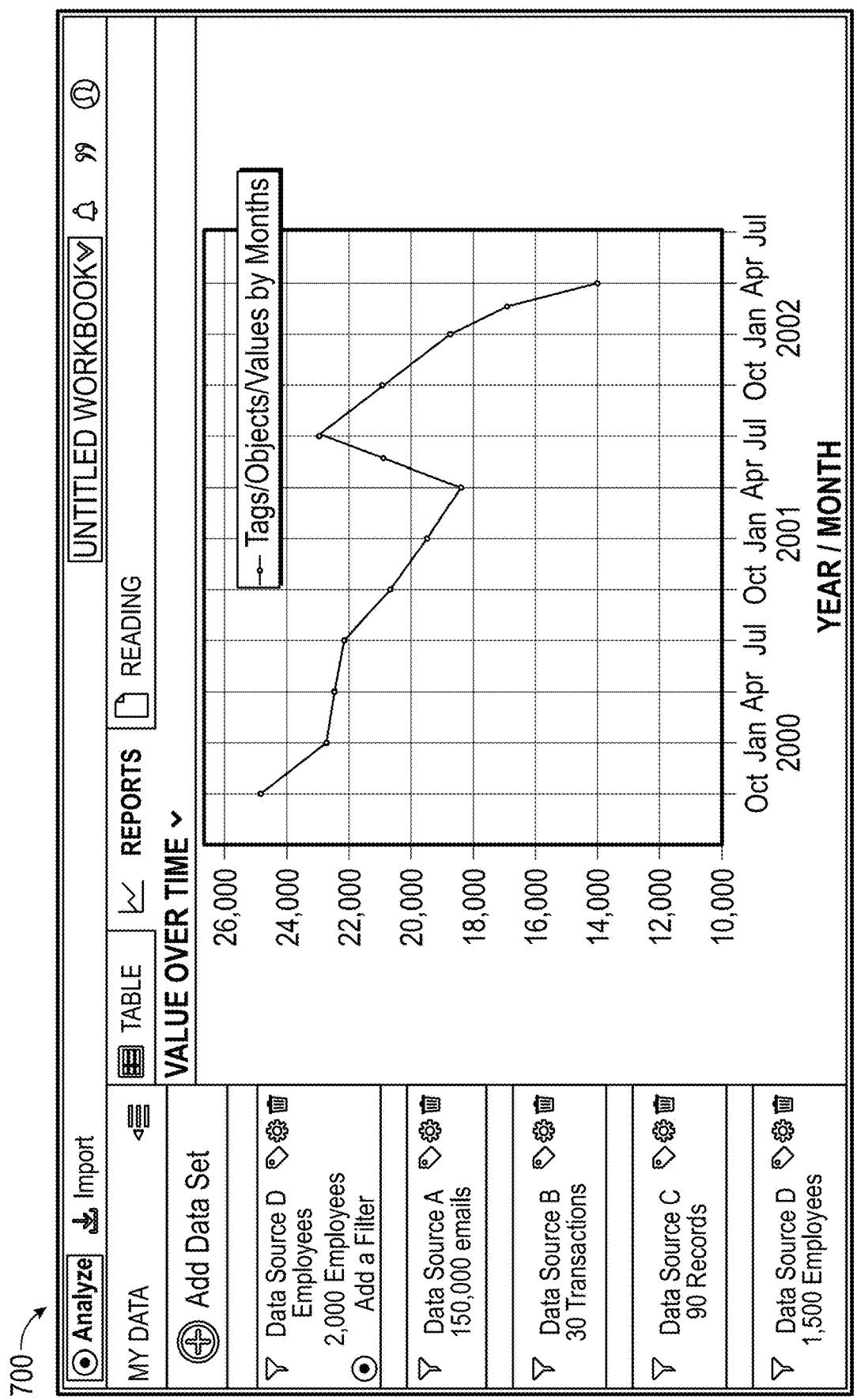
FIG. 7 shows an example graphical interface 700 showing a report

FIG. 7 shows an example graphical interface 700 showing a report. The graphical interface can be displayed in response to a user clicking the "Reports" tab and entering information indicating a type of report that is desired. The Reports tab can include options for formatting the report in different ways (e.g., determining an axis, selecting data sources). The options can include reporting on any objects, object properties, links, or tags, or any aggregation thereof.

The example interface 700 shows a graph reporting a value over time. Examples of values can include salaries paid to employees, commissions earned by employees in the sales department, revenue generated by employees, a number of employee profiles tagged as "important," a number of documents tagged as "not yet reviewed," etc.

The graph can support dynamic user interactions. For example, the user can select a range along the x or y axis to zoom into, mouse over data points to cause labels for the data points to be displayed, etc.

Example Flowchart

Figure 9:
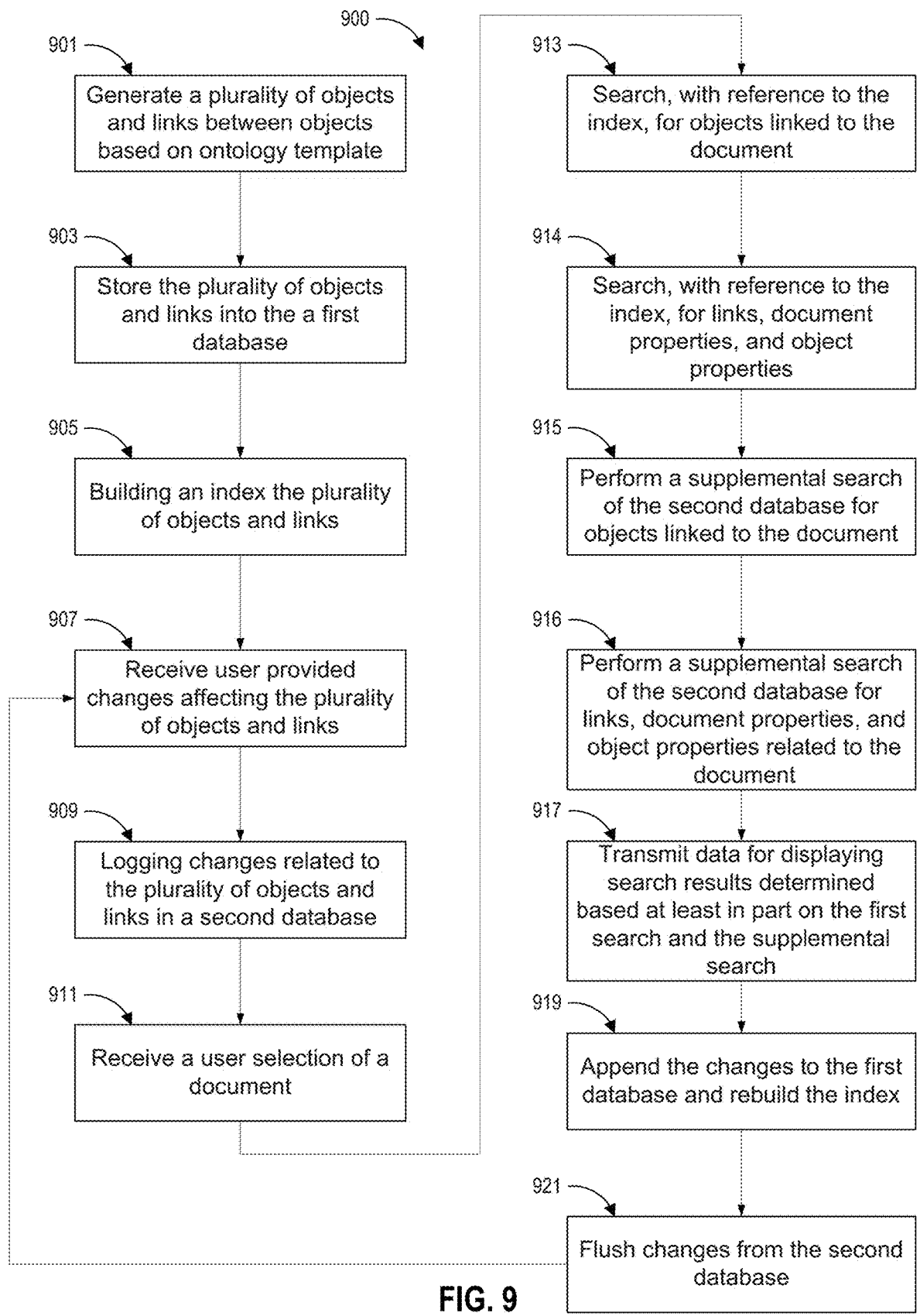
FIG. 9 shows an example flowchart for quickly searching an object model in a document review system.

FIG. 9 shows an example flowchart for quickly searching an object model in a document review system.

At block 901, a plurality of objects and links between objects can be generated based on an ontology template. The ontology template can also be used to generate object properties. In some embodiments, a document object can also be created for each document, and object properties of the document objects can include tags. In some embodiments, there can be different ontology templates for different types of documents. A document intake system 101 as shown in FIG. 1 can generate the plurality of objects and links.

At block 903, the plurality of objects and links can be stored in a first database. This can include, for example, storing the objects and links into database 103 as shown in FIG. 1.

At block 905, an index of the plurality of objects and links can be built. The index (such as index 121 if FIG. 1) can be structured to facilitate a scalable search technique. In some embodiments, the index can include a logical namespace which maps to one or more primary shards and can have zero or more replica shards. Building an index can take a long time, especially if the first database includes a large number of objects or links. The index can facilitate searches of the objects and links, as well as metadata about the documents.

At block 907, edits affecting the plurality of objects and links can be received. For example, a user can tag documents (e.g., as shown in FIG. 5B), add tags, disambiguate linked objects, create new objects or links, etc. As another example, a user can tag a document, and the system can automatically generate a new link between the document and a second document having a same or similar tag.

At block 909, changes related to the plurality of objects and links can be logged in a second database such as second database 113 in FIG. 1. The changes can occur in response to the edits from block 907. The changes can include writes, modifications, and deletions.

At block 911, a user selection of a document can be received. For example, as shown in FIG. 4A, an email can be selected in the viewing panel 405, or as shown in FIG. 5A, an employee profile can be selected in viewing panel 505.

At block 913, a first search can be performed, with reference to the index, for objects linked to the document. The first search can be performed by a search system 105 with reference to index 121 as shown in FIG. 1.

At block 914, a search can be performed for properties of the document, links to the document, or properties of objects linked to the document. In some embodiments, the search of block 914 can be combined together as part of the first in block 913 such that there can be one or more separate or combined searches for objects, object properties, links, and document properties.

At block 915, a supplemental search of the second database can be performed. The supplemental search can include finding changes to (e.g., additional, edits to or deletions of) objects linked to the document. The supplemental search of the second database can be performed with or without reference to an index. In some embodiments, the supplemental search is performed without reference to an index. The supplemental search of the second database can be initiated, caused by, or performed by the document interface system 107 as shown in FIG. 1. In some embodiments, the supplemental search of the second database can be initiated, caused by, or performed by the search system 105 as shown in FIG. 1. In some embodiments, the document interface system 107 and the search system 105 can be implemented on different modules executing on the same hardware.

At block 916, a supplemental search of the second database performed to find any other changes that are not included in the first database. This can include searching for changes to any of the search results from the search in blocks 913 or 914. The supplemental search can include finding additions to, edits of, or deletions of links to the document, properties of objects linked to the document, or the document itself (including properties of the document.

In some embodiments, some or any combination of objects, object properties, links, and document properties can be searched for in blocks 913-916.

At block 917, data for displaying search results can be transmitted. The search results can be determined based at least in part on the first search and the supplemental search.

At block 919, changes (e.g., the changes 123 in the second database) can be appended to the first database, and the index can be rebuilt. In some embodiments, the changes can be written through to or applied to the first database. In some embodiments the changes can be appended to the first database for tracking the changes. Writing the changes to the first database or rebuilding the index can happen periodically, during periods of low use, after a certain amount of changes accumulation, or in response to other conditions.

At block 921, the changes (e.g., the changes 123 in the second database) can be flushed or deleted from the second database after the changes are written to the first database. This can create room for new changes to be recorded in the second database. Block 921 can proceed to 907 and repeat as new changes are provided by a user.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
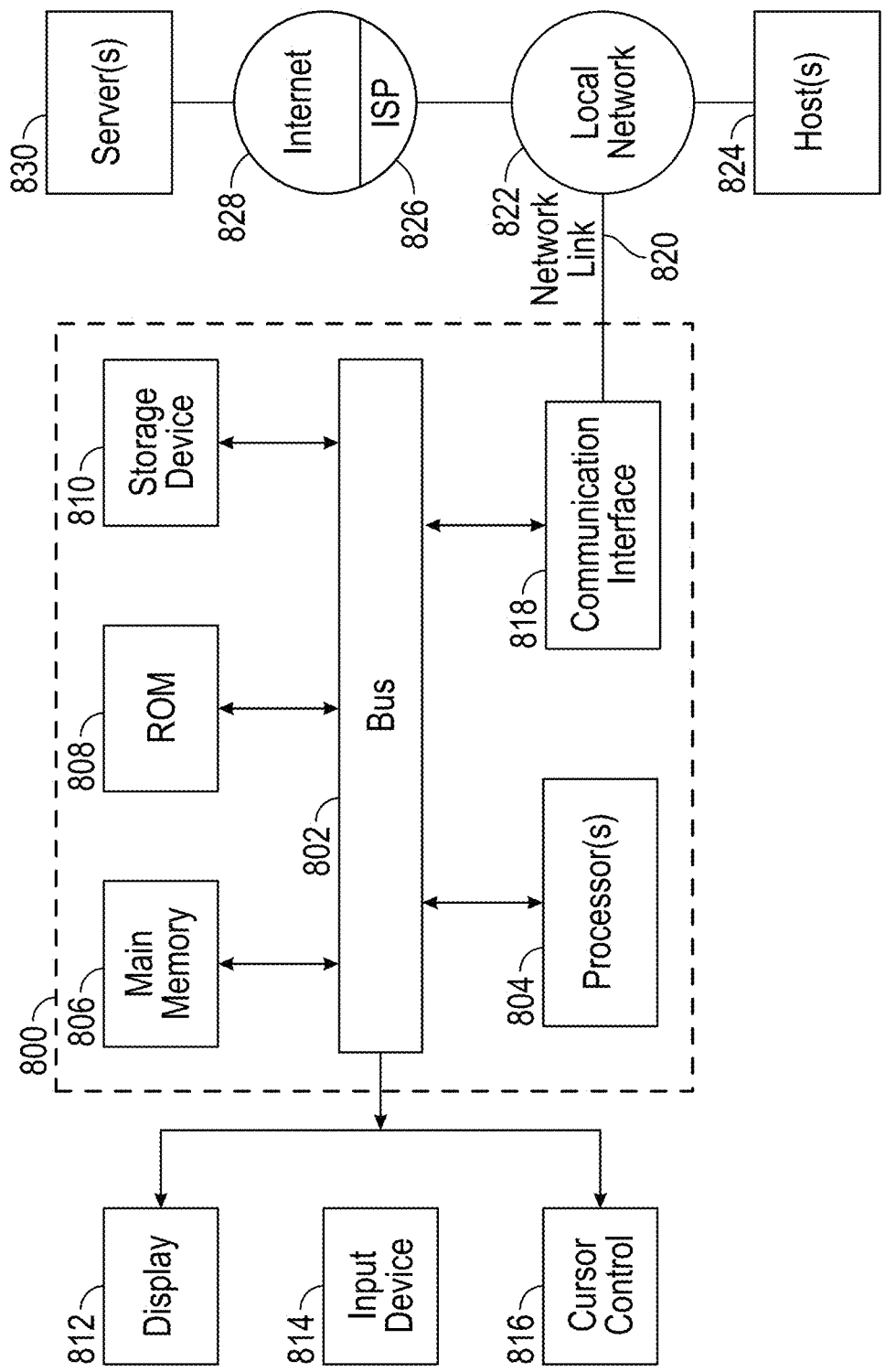
FIG. 8 shows a computer system with which certain methods discussed herein may be implemented.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A search system comprising:
a data intake system configured to generate a plurality of objects and links between objects based at least in part on an ontology;
a first database configured to store the plurality of objects and links;
a search system configured to build an index of the plurality of objects and links;
a second database configured to log changes related to the plurality of objects and links; and
a data interface system configured to receive a user selection of a first object, wherein the first object represents a document;
wherein the search system is configured to search, with reference to the index, for links to the first object;
wherein the data interface system is configured to initiate a supplemental search of the second database for changes in any of the links to the first object, and
wherein the data interface system is configured to transmit data for displaying at least some results of the supplemental search.

2. The system of claim 1, wherein the changes in the second database are configured to be written to the first database.

3. The system of claim 1, wherein the supplemental search of the second database for changes in any of the links to the first object includes changes that are not included in the first database at the time of the supplemental search.

4. The system of claim 1, further comprising one or more data stores including at least 100,000 documents, wherein the data intake system is configured to generate the plurality of objects and the links between objects based at least in part on the at least 100,000 documents, and wherein the first database is separate from the one or more data stores.

5. The system of claim 1, wherein the search is performed using a scalable search technique.

6. The system of claim 1, further comprising an auditing system configured to audit the changes, wherein the changes include edits or deletions, and wherein the changes in the second database are appended to the first database.

7. A computer system comprising:
a computer readable storage medium storing instructions; and
one or more processors configured to execute the instructions to cause the processors to:
generate a plurality of objects and links between objects based at least in part on an ontology;
store the plurality of objects and links in a first database;
build an index of the plurality of objects and links;
store changes affecting the plurality of objects and links in a second database;
receive a user selection of a first object, wherein the first object represents a document;
perform a first search, with reference to the index, for links to the first object;

perform a supplemental search of the second database for changes to any of the links to the first object; and transmit data for displaying search results determined based at least in part on the first search and the supplemental search.

8. The system of claim 7, wherein the changes in the second database are configured to be written to the first database.

9. The system of claim 8, wherein the second database is configured to delete the changes affecting the plurality of objects and links that are stored in the second database after the changes affecting the plurality of objects and links are written to the first database.

10. The system of claim 7, further comprising searching the second database for changes that have not yet been written to the first database when the supplemental search is performed.

11. The system of claim 7, further comprising one or more data stores including at least 100,000 documents, wherein the one or more processors are configured to execute the instructions to further cause the processors to generate the plurality of objects and the links between objects based at least in part on the at least 100,000 documents, wherein the first database is separate from the data store, and wherein the first database is separate from the one or more data stores.

12. The system of claim 7, wherein the first search is performed using a scalable search technique.

13. The system of claim 7, further comprising an auditing system configured to audit the changes, wherein the changes include edits or deletions, and wherein the changes in the second database are appended to the first database.

14. A searching and indexing method comprising:
generating a plurality of objects and links between objects based at least in part on an ontology;
storing the plurality of objects and links in a first database;
building an index of the plurality of objects and links;
storing changes affecting the plurality of objects and links in a second database;
receiving a user selection of a first object, wherein the first object represents a document;
performing a first search, with reference to the index, for links to the first object;
performing a supplemental search of the second database for changes in any of the links to the first object; and
transmitting data for displaying search results determined based at least in part on the first search and the supplemental search.

15. The method of claim 14, wherein the changes in the second database are configured to be written to the first database.

16. The method of claim 14, further comprising performing a search of the second database for changes that have not yet been written to the first database when supplemental search is performed.

17. The method of claim 14, wherein the generating of the plurality of objects and the links between objects is based at least in part on at least 100,000 documents.

18. The method of claim 14, wherein the first search is performed using a scalable search technique.

19. The method of claim 14, further comprising receiving the changes affecting the plurality of objects and links, wherein the changes include edits to a document, tag, object, object property, or link.

* * * * *